United States Patent
Gong et al.

(10) Patent No.: US 10,410,650 B2
(45) Date of Patent: Sep. 10, 2019

(54) METHOD FOR LOCATING SOUND EMITTING POSITION AND TERMINAL DEVICE

(71) Applicant: Huawei Technologies Co., Ltd., Shenzhen (CN)

(72) Inventors: Shuqiang Gong, Shenzhen (CN); Zhidong Tao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/566,979

(22) PCT Filed: May 20, 2015

(86) PCT No.: PCT/CN2015/079391
§ 371 (c)(1),
(2) Date: Oct. 16, 2017

(87) PCT Pub. No.: WO2016/183825
PCT Pub. Date: Nov. 24, 2016

(65) Prior Publication Data
US 2018/0108368 A1    Apr. 19, 2018

(51) Int. Cl.
*G10L 15/22* (2006.01)
*G10L 21/02* (2013.01)
*G06F 9/46* (2006.01)
*B60R 11/02* (2006.01)
*H04R 1/40* (2006.01)
(Continued)

(52) U.S. Cl.
CPC ...... *G10L 21/0205* (2013.01); *B60R 11/0217* (2013.01); *G06F 9/46* (2013.01); *G10L 15/22* (2013.01); *G10L 21/0272* (2013.01); *H04R 1/406* (2013.01); *H04S 7/303* (2013.01); *B60R 16/0373* (2013.01); *G10L 2021/02082* (2013.01); *G10L 2021/02166* (2013.01); *H04R 3/005* (2013.01); *H04R 2201/025* (2013.01);
(Continued)

(58) Field of Classification Search
CPC . G10L 2021/02166; G10L 2021/02082; G10L 15/22; H04R 2499/13; H04R 2410/00; H04R 3/005; H04R 2430/21; H04R 2430/23
USPC ......................................... 381/91–92, 86, 110
See application file for complete search history.

(56) References Cited

U.S. PATENT DOCUMENTS 6,760,449 B1 * 7/2004 Matsuo .................. H04R 1/406
381/122
9,286,030 B2 * 3/2016 Holdren .............. B60R 11/0247
(Continued)

FOREIGN PATENT DOCUMENTS

CN          103680512 A          3/2014
CN          104442622 A          3/2015
(Continued)

*Primary Examiner* — Disler Paul
(74) *Attorney, Agent, or Firm* — Slater Matsil, LLP

(57) ABSTRACT

Embodiments of the present invention provide a method for locating a sound emitting position and a terminal device. The method includes: collecting K first sound signals, where K is an integer greater than or equal to 2; extracting M second sound signals from the K first sound signals according to N position parameters corresponding to N different positions, where M is less than or equal to N, and N is an integer greater than or equal to 2; and determining a position corresponding to each second sound signal.

16 Claims, 6 Drawing Sheets

(51) Int. Cl.
  *H04S 7/00* (2006.01)
  *G10L 21/0272* (2013.01)
  *G10L 21/0208* (2013.01)
  *G10L 21/0216* (2013.01)
  *B60R 16/037* (2006.01)
  *H04R 3/00* (2006.01)

(52) U.S. Cl.
  CPC ...... *H04R 2430/21* (2013.01); *H04R 2430/23* (2013.01); *H04R 2499/13* (2013.01)

(56) References Cited

U.S. PATENT DOCUMENTS

| | | |
|---|---|---|
| 2003/0185358 A1 | 10/2003 | Sakamoto |
| 2008/0071547 A1 | 3/2008 | Prieto et al. |
| 2009/0055180 A1* | 2/2009 | Coon ............... B60R 16/0373 704/251 |
| 2009/0292528 A1 | 11/2009 | Kameyama |
| 2010/0153577 A1 | 6/2010 | Wohlert et al. |
| 2011/0246051 A1 | 10/2011 | Vang et al. |
| 2014/0294195 A1 | 10/2014 | Perez et al. |
| 2015/0086035 A1 | 3/2015 | Shin |
| 2015/0110287 A1* | 4/2015 | Holdren ............... B60R 11/0247 381/86 |
| 2015/0116287 A1* | 4/2015 | Yeh ........................ B43K 8/003 345/179 |
| 2016/0012827 A1* | 1/2016 | Alves .................... H04R 3/005 381/71.1 |
| 2016/0080861 A1* | 3/2016 | Helm ................. B60R 11/0247 381/86 |
| 2016/0173676 A1* | 6/2016 | Heo .................... H04M 1/6091 455/569.1 |
| 2016/0173978 A1 | 6/2016 | Li et al. |
| 2018/0096690 A1* | 4/2018 | Mixter .................. G10L 15/08 |

FOREIGN PATENT DOCUMENTS

| | | |
|---|---|---|
| CN | 104464739 A | 3/2015 |
| CN | 104572258 A | 4/2015 |
| JP | H0418831 A | 1/1992 |
| JP | 2003289587 A | 10/2003 |
| JP | 2004363969 A | 12/2004 |
| JP | 2009282704 A | 12/2009 |
| JP | 2011216090 A | 10/2011 |
| WO | 2006082764 A1 | 8/2006 |

\* cited by examiner

METHOD FOR LOCATING SOUND EMITTING POSITION AND TERMINAL DEVICE

CROSS-REFERENCE TO RELATED APPLICATIONS

This application is a US National Stage of International Application No. PCT/CN2005/07939, filed on May 20, 2015, which application is hereby incorporated herein by reference.

TECHNICAL FIELD

Embodiments of the present invention relate to the field of mobile communications, and in particular, to a method for locating a sound emitting position and a terminal device.

BACKGROUND

Speech recognition is a core technology of a human-computer interaction interface of a current intelligent information system. To improve a success rate of speech recognition, a solution of collecting a sound signal by using a sound collection sensor is generally used, and collection and speech recognition of a sound signal are performed according to a sound emitting position.

Currently, in the solution of improving a success rate of speech recognition, a sound signal emitted from only one position can be extracted. A sound signal emitted from another position can only be considered as noise and filtered out. As a result, the sound signal cannot be accurately extracted, a sound emitting position cannot be located, and speech recognition cannot be performed. An in-vehicle system installed in a car is used as an example. Currently, a sound signal in an ambient environment may be collected by using a sound collection sensor installed in the in-vehicle system, a sound signal emitted from a driver compartment is extracted, and speech recognition is performed on the extracted sound signal emitted from the driver compartment. The in-vehicle system may respond to the sound signal emitted from the driver compartment. However, a sound signal emitted from a front passenger compartment or a sound signal emitted from a back seat in the car is determined as noise and filtered out by the in-vehicle system. As a result, the sound signal cannot be accurately extracted, a sound emitting position cannot be located, and speech recognition cannot be performed. For example, the in-vehicle system may extract and perform speech recognition on a speech command "Open the sunroof" emitted from the driver compartment. However, a speech command "Open the sunroof" emitted from another position such as the front passenger compartment or the back seat in the car cannot be extracted, and an emitting position of another sound signal in the in-vehicle system cannot be located. Therefore, in an application scenario of an in-vehicle system in a car, the in-vehicle system cannot efficiently and accurately locate an emitting position of another sound signal in the car. Consequently, efficiency of locating an emitting position of a sound signal is reduced, and user experience is poor.

SUMMARY

Embodiments of the present invention provide a method for locating a sound emitting position and a terminal device, to resolve a problem that a sound signal emitted from only a single position can be located and extracted and a sound signal emitted from another position cannot be located or extracted.

According to a first aspect of the present invention, a method for locating a sound emitting position is provided. The method includes collecting K first sound signals, where K is an integer greater than or equal to 2. The method also includes extracting M second sound signals from the K first sound signals according to N position parameters corresponding to N different positions, where M is less than or equal to N, and N is an integer greater than or equal to 2. The method also includes determining a position corresponding to each second sound signal.

In a first possible implementation manner, the extracting M second sound signals from the K first sound signals according to N position parameters corresponding to N different positions specifically includes: extracting the M second sound signals from the K first sound signals separately according to the N position parameters by using a beamforming algorithm.

With reference to the first aspect, in a second possible implementation manner, the determining a position corresponding to each second sound signal specifically includes: determining, according to a position parameter corresponding to an $L^{th}$ second sound signal, a position L corresponding to the $L^{th}$ second sound signal, where the $L^{th}$ second sound signal is any one of the M second sound signals.

With reference to the first aspect and any one of the foregoing possible implementation manners, in a third possible implementation manner, after the extracting M second sound signals from the K first sound signals, the method further includes: performing speech recognition on the M extracted second sound signals; and obtaining M speech commands corresponding to the M second sound signals.

With reference to the first aspect and the third possible implementation manner, in a fourth possible implementation manner, after the obtaining M speech commands corresponding to the M second sound signals, the method further includes: responding to the M speech commands.

With reference to the first aspect and the fourth possible implementation manner, in a fifth possible implementation manner, the responding to the M speech commands includes: preferentially responding to a high-priority speech command according to priorities of M different positions corresponding to the M speech commands.

According to a second aspect of the present invention, a terminal device is provided. The terminal device includes K sound collection sensors, configured to collect K first sound signals, where K is an integer greater than or equal to 2. The terminal device also includes a processor, configured to extract M second sound signals from the K first sound signals according to N position parameters corresponding to N different positions, and determine a position corresponding to each second sound signal, where M is less than or equal to N, and N is an integer greater than or equal to 2.

In a first possible implementation manner, the processor being configured to extract M second sound signals from the K first sound signals according to N position parameters corresponding to N different positions specifically includes: the processor being configured to extract the M second sound signals from the K first sound signals separately according to the N position parameters by using a beamforming algorithm.

With reference to the second aspect and the first possible implementation manner, in a second possible implementation manner, the processor being configured to determine a position corresponding to each second sound signal specifically includes: determining, according to a position parameter corresponding to an $L^{th}$ second sound signal, a position L corresponding to the $L^{th}$ second sound signal, where the $L^{th}$ second sound signal is any one of the M second sound signals.

With reference to the second aspect and any one of the foregoing possible implementation manners, in a third possible implementation manner, the processor is further configured to: after extracting the M second sound signals from the K first sound signals, perform speech recognition on the M extracted second sound signals, and obtain M speech commands corresponding to the M second sound signals.

With reference to the second aspect and any one of the foregoing possible implementation manners, in a fourth possible implementation manner, the terminal device further includes an output apparatus, where the output apparatus is configured to respond to the M speech commands after the processor obtains the M speech commands corresponding to the M second sound signals.

With reference to the second aspect and the fourth possible implementation manner, in a fifth possible implementation manner, the output apparatus being configured to respond to the M speech commands specifically includes: the output apparatus being configured to preferentially respond to a high-priority command according to priorities of M different positions corresponding to the M speech commands.

With reference to the second aspect and any one of the foregoing possible implementation manners, coordinates of the K sound collection sensors in a three-dimensional space are different.

According to a third aspect of the present invention, an apparatus for locating a sound emitting position is provided. The apparatus includes: a collection module, an extraction module, and a determining module. The collection module is configured to collect K first sound signals, where K is an integer greater than or equal to 2. The extraction module is configured to extract M second sound signals from the K first sound signals according to N position parameters corresponding to N different positions, where M is less than or equal to N, and N is an integer greater than or equal to 2. The determining module is configured to determine a position corresponding to each second sound signal.

In a first possible implementation manner, the extraction module being configured to extract M second sound signals from the K first sound signals according to N position parameters corresponding to N different positions specifically includes: extracting the M second sound signals from the K first sound signals separately according to the N position parameters by using a beamforming algorithm.

With reference to the third aspect and the first possible implementation manner, in a second possible implementation manner, the determining module being configured to determine a position corresponding to each second sound signal specifically includes: the determining module being configured to determine, according to a position parameter corresponding to an $L^{th}$ second sound signal, a position L corresponding to the $L^{th}$ second sound signal, where the $L^{th}$ second sound signal is any one of the M second sound signals.

With reference to the third aspect and any one of the foregoing possible implementation manners, in a third possible implementation manner, the apparatus further includes a speech recognition module and an obtaining module, where the speech recognition module is configured to perform speech recognition on the M extracted second sound signals after the M second sound signals are extracted from the K first sound signals; and the obtaining module is configured to obtain M speech commands corresponding to the M second sound signals.

With reference to the third aspect and the third possible implementation manner, in a fourth possible implementation manner, the apparatus further includes a response module, where the response module is configured to respond to the M speech commands after the obtaining module obtains the M speech commands corresponding to the M second sound signals.

With reference to the third aspect and the fourth possible implementation manner, in a fifth possible implementation manner, the response module being configured to respond to the M speech commands includes: preferentially responding to a high-priority speech command according to priorities of M different positions corresponding to the M speech commands.

It can be seen from the foregoing technical solutions that, the embodiments of the present invention have the following advantages: M second sound signals are extracted from K first sound signals according to position parameters by using a beamforming algorithm, so that an emitting position corresponding to each second sound signal may be determined. By means of the method, sound signals emitted from different positions can be efficiently extracted, and a capability of speech recognition is provided, thereby providing better user experience for users. Conflicting commands are processed in a prioritized manner, thereby reducing an error caused when an in-vehicle central control device simultaneously responds to multiple commands.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Embodiments of the present invention provide a method for locating a sound emitting position. A terminal device involved in the embodiments of the present invention may be an in-vehicle central control device, a smartphone, a tablet computer, or the like.

In the prior art, a beamforming algorithm and a solution of collecting a sound signal by using a sound collection sensor are combined and applied to collection and speech recognition of a sound signal, and a success rate of speech recognition is greatly improved by using this manner. However, a sound signal emitted from only a single sound emitting position can be recognized by using this manner. When sound signals are emitted from multiple sound emitting positions, a speech recognition system cannot simultaneously recognize multiple sound signals.

In the embodiments of the present invention, a first sound signal or a second sound signal is merely intended for distinguishing, and does not denote an order or a sequence.

Figure 1:
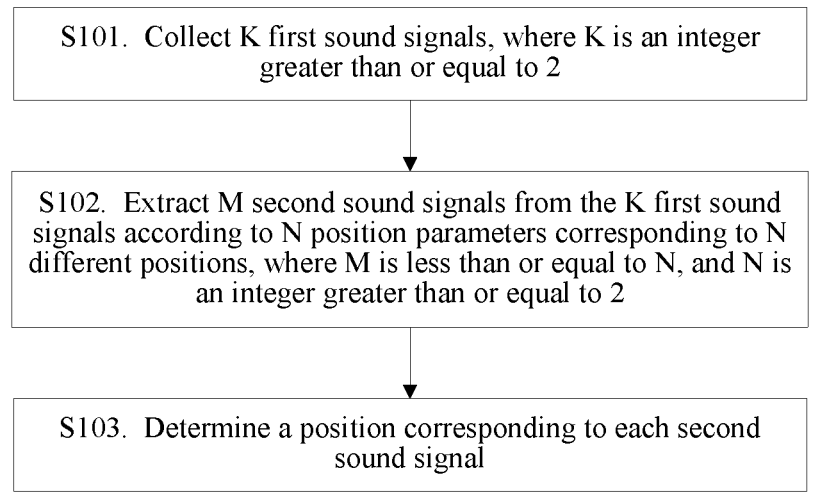
FIG. 1 is a flowchart of a method for locating a sound emitting position according to an embodiment of the present invention.

FIG. 1 is a flowchart of a method for locating a sound emitting position according to an embodiment of the present invention. An application scenario of this embodiment of the present invention may be any scenario of sound collection and speech recognition. In this embodiment of the present invention, sound collection and speech recognition in an in-vehicle system are used as an example, and the method includes the following steps.

S101. Collect K first sound signals, where K is an integer greater than or equal to 2.

In the in-vehicle system, there are K sound collection sensors inside the in-vehicle system, and a processor may collect K first sound signals, where K is an integer greater than or equal to 2.

For example, in the in-vehicle system, K may be set to 2, that is, a first sound collection sensor and a second sound collection sensor may be respectively installed in a driver compartment and a front passenger compartment.

The first sound collection sensor and the second sound collection sensor simultaneously collect a first sound signal. Optionally, in the in-vehicle system, another sound collection sensor may be further installed at a back seat in a car or in another position in the car.

Figure 2A:
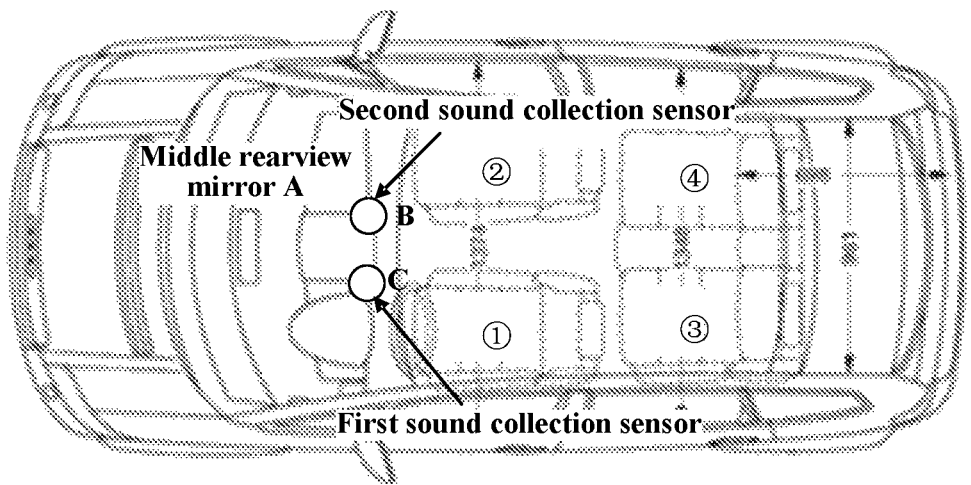
FIG. 2A is a schematic diagram of positions inside a car in which a sound emitting position is located according to an embodiment of the present invention.

In this embodiment of the present invention, the first sound signal is an environmental sound inside the in-vehicle system, and includes sound signals emitted from different positions in the car and a sound signal outside the car. The first sound signal may include at least one of a sound signal emitted from a position of the driver compartment (for example, as shown in FIG. 2A, a position ①), a sound signal emitted from a position of the front passenger compartment (for example, as shown in FIG. 2A, a position ②), a sound signal emitted from a position of a back seat in the in-vehicle system (for example, as shown in FIG. 2A, a position ③ and a position ④), or a noise outside the in-vehicle system.

S102. Extract M second sound signals from the K first sound signals according to N position parameters corresponding to N different positions, where M is less than or equal to N, and N is an integer greater than or equal to 2.

Similarly, a case of the in-vehicle system is used as an example for description. Coordinates of the first sound collection sensor and the second sound collection sensor do not overlap in spatial position, and there is a particular distance between the first sound collection sensor and the second sound collection sensor. As shown in FIG. 2A, the first sound collection sensor and the second sound collection sensor are respectively disposed on a left side and a right side of a middle rearview mirror A of the in-vehicle system. The first sound collection sensor is disposed in a position C of the in-vehicle system, and the second sound collection sensor is disposed in a position B of the in-vehicle system. Therefore, a time of a sound signal collected by the first sound collection sensor is different from a time of a sound signal collected by the second sound collection sensor. In this case, a phase difference is formed between the sound signal collected by the first sound collection sensor and the sound signal collected by the second sound collection sensor.

Figure 2B:
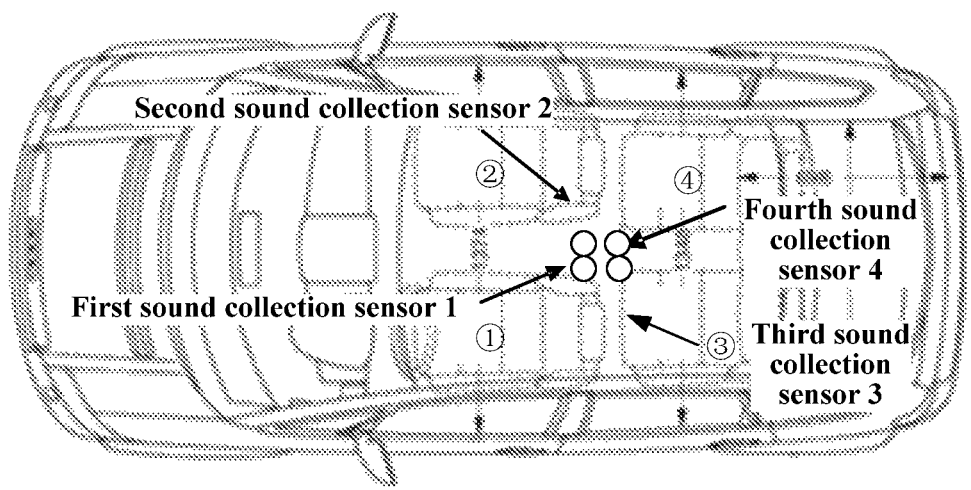
FIG. 2B is a schematic diagram of positions inside a car in which a sound emitting position is located according to another embodiment of the present invention.

In another embodiment of the present invention, as shown in FIG. 2B, an in-vehicle system includes four sound collection sensors. In this case, K is 4. The four sound collection sensors are disposed in a central position of the in-vehicle system, as shown in FIG. 2B.

Extracting M second sound signals from the K first sound signals may be specifically extracting the M second sound signals from the K first sound signals by using a beamforming algorithm; or may be extracting the M second sound signals from the K first sound signals by filtering out other sound signals by using a beamforming algorithm.

For example, an emitting position of a sound signal is the position of the driver compartment, and a corresponding position parameter is a parameter of the position of the driver compartment. An in-vehicle central control device extracts, from the K first sound signals according to the position parameter of the driver compartment corresponding to the driver compartment, a second sound signal emitted from the driver compartment.

S103. Determine a position corresponding to each second sound signal. The in-vehicle central control device extracts the M second sound signals from the K first sound signals separately according to N position parameters by using a beamforming algorithm.

For example, when a position parameter is the position parameter of the driver compartment, a second sound signal is extracted according to the position parameter of the driver compartment by using the beamforming algorithm, and it is determined, according to the position parameter corresponding to the second sound signal, that an emitting position corresponding to the extracted second sound signal is the driver compartment.

The present invention provides a method for locating a sound emitting position, where M second sound signals are extracted from K first sound signals according to position parameters by using a beamforming algorithm, so that an emitting position corresponding to each second sound signal may be determined. By means of the method, sound signals emitted from different positions can be efficiently extracted, and a capability of speech recognition is improved, thereby providing better user experience for users.

Figure 3:
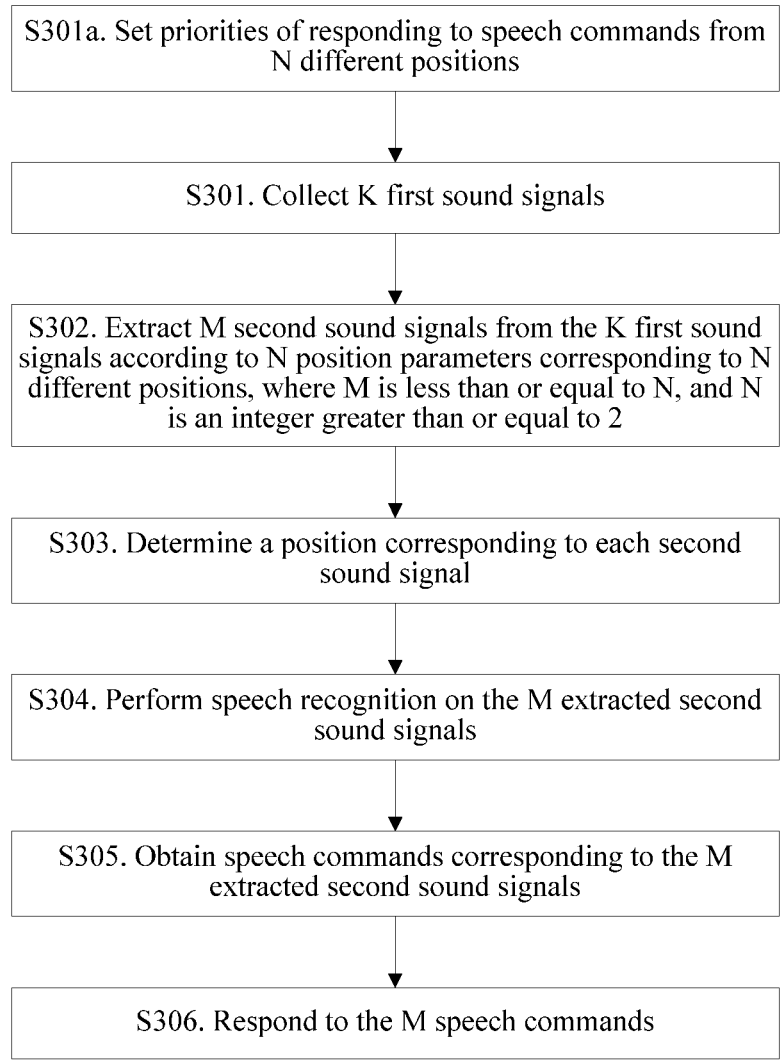
FIG. 3 is a flowchart of a method for locating a sound emitting position according to another embodiment of the present invention.

FIG. 3 is a flowchart of a method for locating a sound emitting position according to another embodiment of the present invention. Similarly, in this embodiment of the present invention, application to an in-vehicle system is used as an example for description. As shown in FIG. 3, the method includes the following steps.

S301a. Set priorities of responding to speech commands from N different positions.

Similarly, a schematic diagram of positions in FIG. 2A is used as an example. In FIG. 2A, a position ① is a position of a driver compartment, a position ② is a position of a front passenger compartment, a position ③ is a position of a left back seat in the in-vehicle system, and a position ④ is a position of a right back seat in the in-vehicle system.

In this embodiment of the present invention, the in-vehicle system is used as an example. It is assumed that K is 2, N is 4, and M is 2.

An in-vehicle central control device in the in-vehicle system sets, according to four different positions, priorities of responding to speech commands from the four different positions.

For example, priorities of speech commands that are set in a common family sedan are used as an example.

TABLE 1

Priorities of speech commands that are set in a common family sedan

| Command | Open the sunroof | Close the sunroof | Turn on the radio | Play music |
| --- | --- | --- | --- | --- |
| Position ① | 1 | 1 | 1 | 1 |
| Position ② | 1 | 1 | 2 | 2 |
| Position ③ | 2 | 2 | 3 | 3 |
| Position ④ | 2 | 2 | 4 | 4 |

It can be seen from Table (1) that, when a command such as "Open the sunroof", "Close the sunroof", "Turn on the radio", or "Play music" is emitted from the position ①, a priority of the command emitted from the position ① is higher than a priority of a command that has a same meaning and that is emitted from another position.

In another embodiment of the present invention, when priorities of responding to speech commands from N different positions are being set, a determining factor regarding a child's sound and an adult's sound is added. A priority of a speech command that is a child's sound is set to a low priority, or it is set that when a speech command is a child's sound, the speech command that is a child's sound is to be blocked. A priority of a speech command that is an adult's sound is set to a high priority.

In this embodiment of the present invention, a command "Turn on the air conditioner" that is emitted from the position ① and a command "Turn off the air conditioner" that is emitted from the position ④ at the same time are used as an example.

S301. Collect K first sound signals.

In this embodiment of the present invention, that K is 2 is used as an example for description.

In the in-vehicle system, a first sound collection sensor and a second sound collection sensor are respectively installed on a left side and a right side of a middle rearview mirror A.

The first sound collection sensor and the second sound collection sensor simultaneously collect a first sound signal. Optionally, in the in-vehicle system, another sound collection sensor may be further installed at a back seat in a car or in another position in the car.

For example, when a sound signal of the command "Turn on the air conditioner" is emitted from the position ① and at the same time a sound signal of the command "Turn off the air conditioner" is emitted from the position ④, the first sound collection sensor and the second sound collection sensor simultaneously collect the sound signal of the command "Turn on the air conditioner" that is emitted from the position ①. Similarly, the first sound collection sensor and the second sound collection sensor simultaneously collect the sound signal of the command "Turn off the air conditioner" that is emitted from the position ④.

S302. Extract M second sound signals from the K first sound signals according to N position parameters corresponding to N different positions, where M is less than or equal to N, and N is an integer greater than or equal to 2.

In this embodiment of the present invention, that N is 4 and M is 2 is used as an example for description.

Coordinates of the first sound collection sensor and the second sound collection sensor do not overlap in spatial position, and there is a particular distance between the first sound collection sensor and the second sound collection sensor. Therefore, a time of a sound signal collected by the first sound collection sensor is different from a time of a sound signal collected by the second sound collection sensor. In this case, a phase difference is formed between the sound signal collected by the first sound collection sensor and the sound signal collected by the second sound collection sensor.

In the present invention, an example in which the first sound collection sensor and the second sound collection sensor are respectively disposed on the left side and the right side of the middle rearview mirror is used. In the present invention, a quantity of sound collection sensors is not limited, and positions of the sound collection sensors are not limited either. For example, another sound collection sensor may be further disposed around a position from which a sound may be emitted, for example, installed on a rear side of a seat in a position ① or a position ② shown in FIG. 2A.

For example, the in-vehicle central control device extracts, according to a preset position parameter of the position ①, a second sound signal emitted from the position ①. The in-vehicle central control device extracts, from the collected first sound signals according to the preset position parameter of the position ① by using a beamforming algorithm, the second sound signal emitted from the position ①.

At the same time, the in-vehicle central control device extracts, according to a preset position parameter of the position ④, a second sound signal emitted from the position ④. The in-vehicle central control device extracts, from the collected first sound signals according to the preset position parameter of the position ④ by using the beamforming algorithm, the second sound signal emitted from the position ④.

For example, the in-vehicle central control device extracts, according to the position parameter of the position ① by using the beamforming algorithm, a sound signal that meets the preset position parameter of the position ①. For example, a sound signal of "Turn on the air conditioner" that is emitted from the position ① is collected. The in-vehicle central control device extracts, according to the position parameter of the position ④ by using the beamforming algorithm, a sound signal that meets the preset position parameter of the position ④. For example, a sound signal of "Turn off the air conditioner" that is emitted from the position ④ is collected.

S303. Determine a position corresponding to each second sound signal.

The in-vehicle central control device extracts two second sound signals from the two first sound signals separately according to four position parameters by using the beamforming algorithm.

For example, when a position parameter is the position parameter of the position ①, a second sound signal emitted from the position ① is extracted according to the position parameter of the position ① by using the beamforming algorithm, and it is determined, according to the position parameter corresponding to the second sound signal, that an emitting position corresponding to the extracted second sound signal is the position ①.

S304. Perform speech recognition on the M extracted second sound signals.

The in-vehicle central control device performs speech recognition on the extracted sound signals, to recognize the extracted sound signals.

For example, the in-vehicle central control device performs speech recognition on a sound signal extracted from the position ①, and recognizes that the extracted sound signal is "Turn on the air conditioner". The in-vehicle central control device performs speech recognition on a sound signal extracted from the position ④, and recognizes that the extracted sound signal is "Turn off the air conditioner".

S305. Obtain speech commands corresponding to the M second sound signals.

The in-vehicle central control device obtains the speech commands corresponding to the M extracted second sound signals.

For example, the in-vehicle central control device obtains a speech command corresponding to the extracted sound signal emitted from the position ①, and obtains a speech command "Turn on the air conditioner". The in-vehicle central control device obtains a speech command corresponding to the extracted sound signal emitted from the position ④, and obtains a speech command "Turn off the air conditioner".

S306. Respond to the M speech commands.

The in-vehicle central control device responds to the M speech commands according to the obtained speech commands corresponding to the M extracted second sound signals.

For example, after obtaining the speech command "Turn on the air conditioner" that is emitted from the position ①, the in-vehicle central control device responds to the speech command, and turns on the air conditioner.

In another embodiment of the present invention, the in-vehicle central control device performs speech recognition on a sound signal extracted from the position ① and a sound signal extracted from the position ④, to recognize the extracted sound signals. The in-vehicle central control device performs speech recognition on the extracted sound signal emitted from the position ① and the extracted sound signal emitted from the position ④, to recognize the extracted sound signals. A speech command corresponding to the extracted sound signal emitted from the position ① is obtained, and a speech command corresponding to the extracted sound signal emitted from the position ④ is obtained. For example, a speech command "Turn on the air conditioner" emitted from the position ① and a speech command "Turn off the air conditioner" emitted from the position ④ are obtained. According to the obtained speech command "Turn on the air conditioner" emitted from the position ① and the obtained speech command "Turn off the air conditioner" emitted from the position ④, the in-vehicle central control device responds to the two speech commands. Optionally, when obtaining speech commands from two positions by means of speech recognition, the in-vehicle central control device may preferentially respond to a high-priority speech command according to priorities of the two different positions corresponding to the two speech commands. For example, a priority of the position ① is higher than a priority of the position ④. The in-vehicle central control device preferentially responds to the speech command "Turn on the air conditioner" from the position ①, so as to turn on the air conditioner. The in-vehicle central control device then responds to the speech command "Turn off the air conditioner" from the position ④. In this case, the speech command that is from the position ① and to which the in-vehicle central control device responds is "Turn on the air conditioner", and the speech command from the position ④ is "Turn off the air conditioner". Therefore, the speech command from the position ① and the speech command from the position ④ are conflicting commands, and the in-vehicle central control device cannot respond to both the speech command from the position ① and the speech command from the position ④. Therefore, after performing speech recognition on the sound signal from the position ④, the in-vehicle central control device obtains the speech command corresponding to the extracted sound signal, and does not respond to the speech command from the position ④. Conflicting commands are processed in a prioritized manner, and when the in-vehicle central control device responds to multiple conflicting commands, it becomes less likely that the in-vehicle central control device cannot make a correct response due to a command conflict, so that an error caused by a responding mistake is reduced.

The conflicting commands are specifically defined as follows: When a same resource is used for at least two commands, and different operations are performed on the same used resource during execution of the at least two commands, the at least two commands are conflicting commands.

In another embodiment of the present invention, when two obtained speech commands conflict with each other, a determining factor regarding a time is added. When the in-vehicle central control device recognizes a conflicting command within a preset time T1 after a high-priority command is recognized, but the recognized conflicting command has a relatively low priority, the command having a relatively low priority is ignored. When the in-vehicle central control device recognizes a conflicting command after a preset time T1 after a high-priority command is recognized, the in-vehicle central control device responds to obtained speech commands according to a chronological order in which the speech commands are recognized.

Figure 3A:
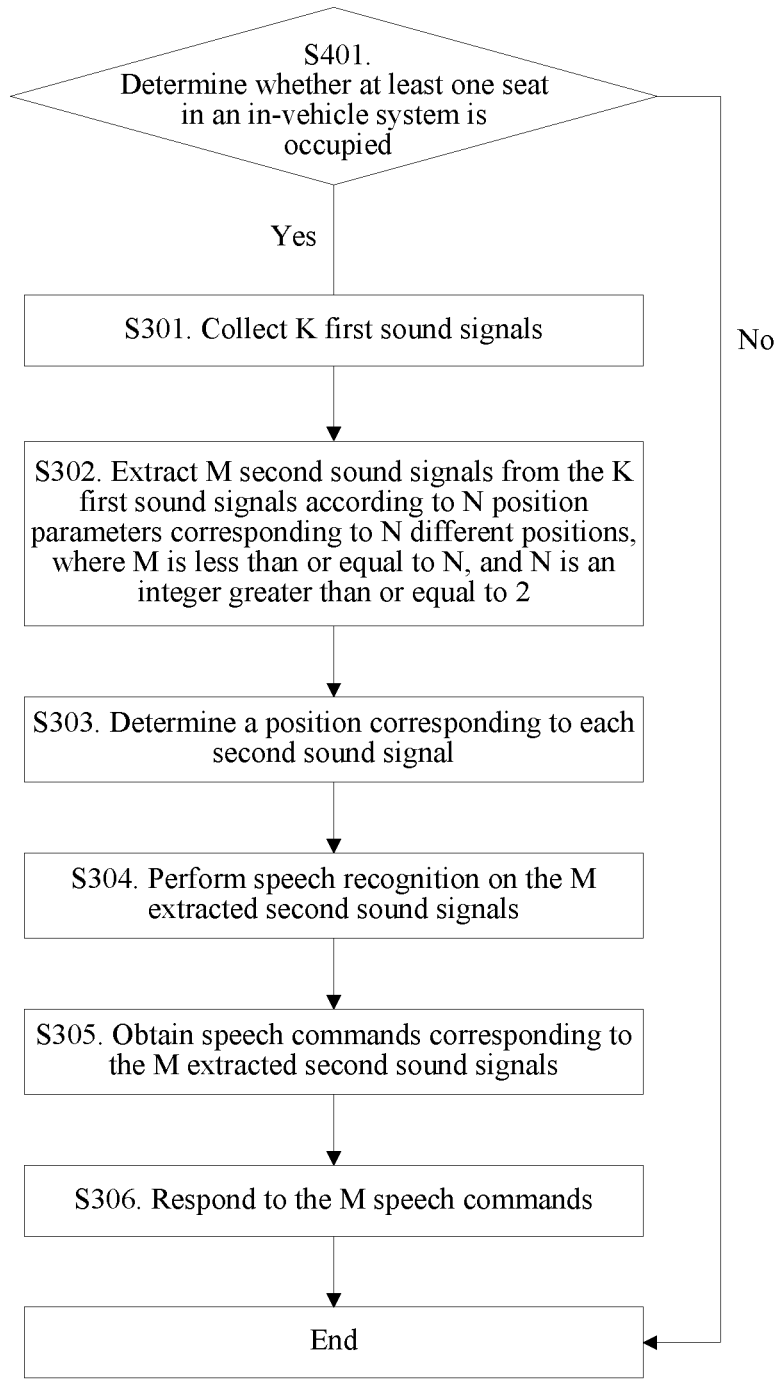
FIG. 3A is a flowchart of a method for locating a sound emitting position according to another embodiment of the present invention.

FIG. 3A is a flowchart of a method for locating a sound emitting position according to another embodiment of the present invention. In the another embodiment of the present invention, before step S301 is performed, the following step may be performed.

S401. Determine whether at least one seat in an in-vehicle system is occupied.

Specifically, the in-vehicle system may determine, by means of gravity sensing, whether a seat in the in-vehicle system is occupied.

For example, it is determined, by means of gravity sensing, whether a seat in the in-vehicle system in FIG. 2A is occupied. For example, it is determined whether the position ①, the position ②, the position ③, or the position ④ in FIG. 2A is occupied.

When the in-vehicle system determines that no seat in the in-vehicle system is occupied, step S301 is not performed.

When the in-vehicle system determines that at least one seat in the in-vehicle system is occupied, step S301 is performed.

Before a sound signal is collected, it is first determined whether at least one seat in the in-vehicle system is occupied. A sound emitting position is located only when a seat in the in-vehicle system is occupied, thereby improving efficiency of sound collection and improving efficiency of determining a sound emitting position.

Figure 3B:
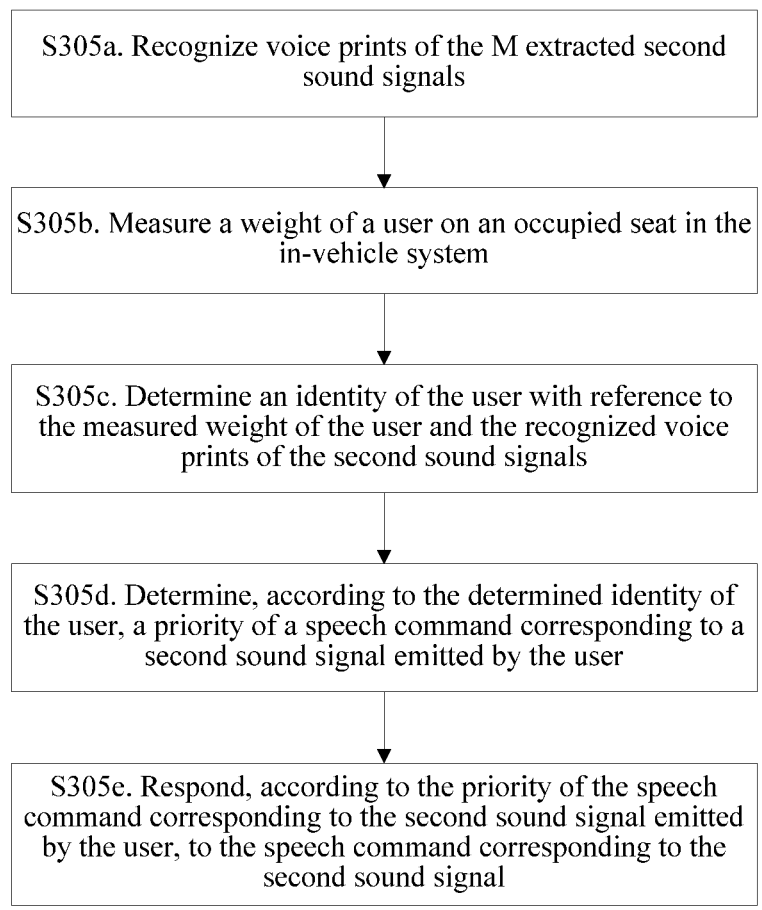
FIG. 3B is a flowchart of a method for locating a sound emitting position according to another embodiment of the present invention.

In another embodiment of the present invention, as shown in FIG. 3B, after step S305 is performed, step S305a may be performed: recognizing voice prints of the M extracted second sound signals.

S305b. Measure a weight of a user on an occupied seat in the in-vehicle system.

S305c. Determine an identity of the user with reference to the measured weight of the user and the recognized voice prints of the second sound signals.

S305d. Determine, according to the determined identity of the user, a priority of a speech command corresponding to a second sound signal emitted by the user.

S305e. Respond, according to the priority of the speech command corresponding to the second sound signal emitted by the user, to the speech command corresponding to the second sound signal.

In a manner that combines gravity sensing and voice print recognition, an identity of a user and a priority of a speech command corresponding to a sound signal emitted by the user are determined. With reference to the priority of the speech command corresponding to the sound signal emitted by the user, priorities of responding to multiple speech commands are determined, thereby reducing an error and a mistake that occur in the in-vehicle central control device because the in-vehicle central control device needs to respond to multiple speech commands.

The present invention provides a method for locating a sound emitting position, where M second sound signals are extracted from K first sound signals according to position parameters by using a beamforming algorithm, so that an emitting position corresponding to each second sound signal may be determined. Further, priorities of speech commands are set, and a method of preferentially processing a high-priority command is used to process conflicting commands, thereby reducing a conflict caused when an in-vehicle central control device responds to multiple conflicting commands, so that an error caused by a responding mistake is reduced, thereby improving user experience.

Figure 4:
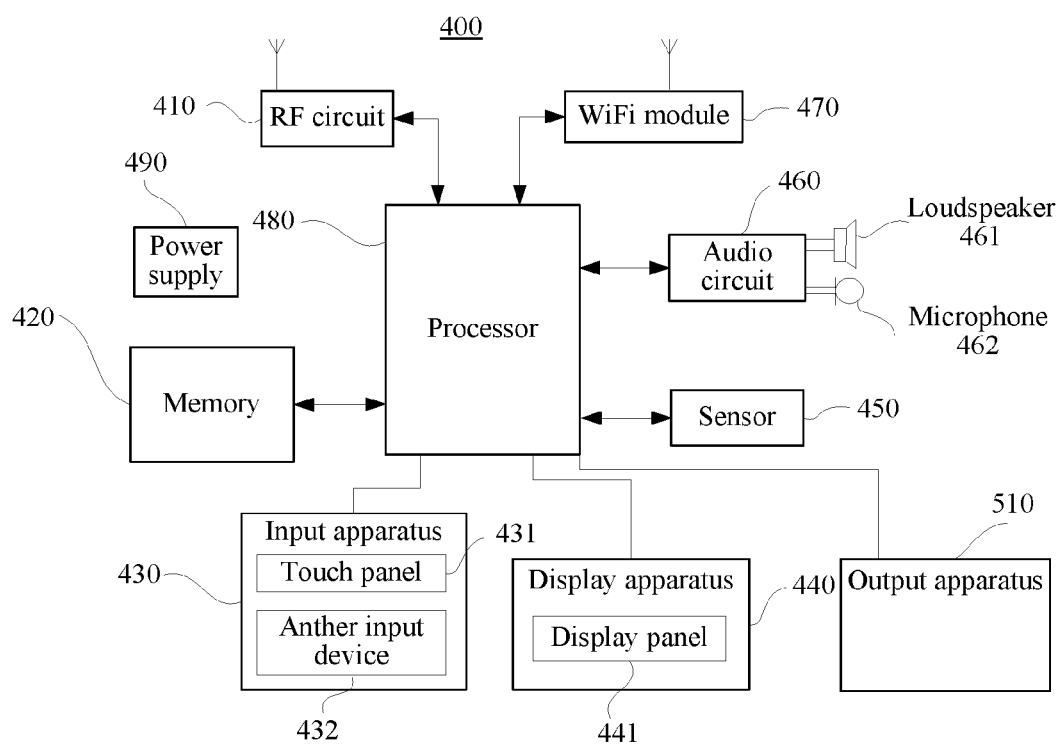
FIG. 4 is a schematic structural diagram of a terminal device 400 according to an embodiment of the present invention.

FIG. 4 is a terminal device 400 according to an embodiment of the present invention. The terminal device 400 may be configured to perform the foregoing methods in the embodiments of the present invention. As shown in FIG. 4, the terminal device 400 may be a terminal device such as a mobile phone, a tablet computer, a PDA (Personal Digital Assistant), a POS (Point of Sale), or an in-vehicle central control terminal device. The terminal device 400 includes components such as an RF (Radio Frequency) circuit 410, a memory 420, an input apparatus 430, a display apparatus 440, a sensor 450, an audio circuit 460, a WiFi (Wireless Fidelity) module 470, a processor 480, and a power supply 490. A person skilled in the art may understand that the structure of the terminal device shown in FIG. 4 is merely an example of an implementation manner, constitutes no limitation on the terminal device, and may include more or fewer components than those shown in the figure, or a combination of some components, or different component arrangements.

The RF circuit 410 may be configured to receive and send signals during an information receiving and sending process or a call process. Particularly, the RF circuit 410 receives downlink information from a base station, then delivers the downlink information to the processor 480 for processing, and sends related uplink data to the base station. Generally, the RF circuit 410 includes, but is not limited to, an antenna, at least one amplifier, a transceiver, a coupler, an LNA (Low Noise Amplifier), and a duplexer. In addition, the RF circuit 410 may further communicate with a network and another terminal device by means of wireless communication. The wireless communication may use any communications standard or protocol, including, but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, and SMS (Short Messaging Service).

The memory 420 may be configured to store a software program and a module, and the processor 480 runs the software program and the module that are stored in the memory 420, so as to perform various functional applications of the terminal device 400 and data processing. The memory 420 may mainly include a program storage area and a data storage area, where the program storage area may store an operating system, an application program needed by at least one function (such as a sound playback function and an image display function), and the like, and the data storage area may store data (such as audio data and a phone book) created according to use of the terminal device 400, and the like. In addition, the memory 420 may include a high-speed random access memory, and may further include a non-volatile memory, such as at least one magnetic disk storage device, a flash storage device, or another volatile solid-state storage device.

The display apparatus 440 may be configured to display information entered by a user or information provided for a user, and various menus of the terminal device 400. The display apparatus 440 may include a display panel 441. Optionally, the display panel 441 may be configured by using a form such as an LCD (Liquid Crystal Display), an OLED (Organic Light-Emitting Diode), or the like. Further, the touch panel 431 may cover the display panel 441. After detecting a touch operation on or near the touch panel 431, the touch panel 431 transfers the touch operation to the processor 480, so as to determine a type of a touch event. The processor 480 then provides a corresponding visual output on the display panel 441 according to the type of the touch event. In FIG. 4, the touch panel 431 and the display panel 441 are used as two independent components to implement an input function and an output function of the terminal device 400. However, in some embodiments, the touch panel 431 and the display panel 441 may be integrated to implement the input function and the output function of the terminal device 400. For example, the touch panel 431 and the display panel 441 may be integrated as a touchscreen, to implement the input function and the output function of the terminal device 400.

The terminal device 400 may further include at least one sensor 450, such as a light sensor, a motion sensor, and another sensor. Specifically, the light sensor may include an ambient light sensor and a proximity sensor, where the ambient light sensor may adjust brightness of the display panel 441 according to luminance of ambient light, and the proximity sensor may switch off the display panel 441 or backlight when the terminal device 400 approaches an ear. As one type of motion sensor, an accelerometer sensor may detect values of accelerations in various directions (generally, tri-axial), may detect a value and a direction of the gravity when the terminal device 400 is static, and may be applied to an application that recognizes a posture of a mobile phone (for example, switching between landscape orientation and portrait orientation, a related game, and magnetometer posture calibration), a function related to vibration recognition (such as a pedometer and tapping), and the like. As for other sensors such as a gyroscope, a barometer, a hygrometer, a thermometer, and an infrared sensor that may be further configured on the terminal device 400, details are not described herein.

The audio circuit 460, a loudspeaker 461, and a microphone 462 may provide an audio interface between a user and the terminal device 400. The audio circuit 460 may convert received audio data into an electric signal and transmit the electric signal to the loudspeaker 461. The loudspeaker 461 converts the electric signal into a sound signal for output. On the other hand, the microphone 462 converts a collected sound signal into an electric signal. The audio circuit 460 receives the electric signal, converts the electric signal into audio data, and outputs the audio data to the processor 480 for processing. The processor 480 then sends the audio data to, for example, another mobile phone by using the RF circuit 410, or outputs the audio data to the memory 420 for further processing.

The terminal device 400 may help, by using the WiFi module 470, a user receive and send e-mails, browse a webpage, access streaming media, and the like. The WiFi module 470 provides wireless broadband Internet access for the user. Although FIG. 4 shows the WiFi module 470, it may be understood that the WiFi module 470 is not an essential component of the terminal device 400, and when required, the WiFi module 470 may be omitted as long as the scope of the essence of the present invention is not changed.

The processor 480 is a control center of the terminal device 400, connects all parts of an entire mobile phone by using various interfaces and lines, and performs various functions of the terminal device 400 and processes data by running or performing a software program, or a module, or both that are stored in the memory 420 and calling data stored in the memory 402, so as to perform overall monitoring on the terminal device. Optionally, the processor 480 may include one or more processing units. Preferably, the processor 480 may integrate an application processor and a modem processor. The application processor mainly processes an operating system, a user interface, an application program, and the like. The modem processor mainly processes wireless communication. It may be understood that the foregoing modem processor may be not integrated into the processor 480. The processor 480 may be specifically a central processing unit (CPU).

The terminal device 400 further includes the power supply 490 (for example, a battery) that supplies power to various components. Preferably, the power supply may be logically connected to the processor 480 by using a power management system, so as to implement a function such as charging, discharging, and power consumption management by using the power management system.

In this embodiment of the present invention, the terminal device 400 includes: K sound collection sensors 450 and the processor 480, and has the following functions.

The sound collection sensors 450 are configured to collect K first sound signals, where K is an integer greater than or equal to 2.

Specifically, coordinates of the K sound collection sensors in a three-dimensional space are different.

The processor 480 is configured to extract M second sound signals from the K first sound signals according to N position parameters corresponding to N different positions, and determine a position corresponding to each second sound signal, where M is less than or equal to N, and N is an integer greater than or equal to 2.

In another embodiment of the present invention, the processor 480 being configured to determine a position corresponding to each second sound signal specifically includes: determining, according to a position parameter corresponding to an $L^{th}$ second sound signal, a position L corresponding to the $L^{th}$ second sound signal, where the $L^{th}$ second sound signal is any one of the M second sound signals.

In another embodiment of the present invention, the processor 480 is further configured to: after extracting the M second sound signals from the K first sound signals, perform speech recognition on the M extracted second sound signals, and obtain M speech commands corresponding to the M second sound signals.

In another embodiment of the present invention, the terminal device 400 further includes an output apparatus 510, where the output apparatus 510 is configured to respond to the M speech commands after the processor obtains the M speech commands corresponding to the M second sound signals.

The output apparatus 510 being configured to respond to the M speech commands specifically includes: the output apparatus being configured to preferentially respond to a high-priority command according to priorities of M different positions corresponding to the M speech commands.

In this embodiment of the present invention, the output apparatus 510 may be specifically the audio circuit 460 or the display apparatus 440.

In the embodiments of the present invention, a method for locating a sound emitting position and a terminal device are provided. M second sound signals are extracted from K first sound signals according to position parameters by using a beamforming algorithm, so that an emitting position corresponding to each second sound signal may be determined. By means of the method, sound signals emitted from different positions can be efficiently extracted, and a capability of speech recognition is provided, thereby providing better user experience for users.

A person of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, the foregoing mobile terminal and access terminal separately perform a working process in the described method embodiments of the present invention; and for specific working, reference may be made to a corresponding process in the foregoing method embodiments, and details are not described herein again.

In the several embodiments provided in the present application, the disclosed server and method may be implemented in other manners. For example, the described server embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit.

A person skilled in the art may understand: All or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
    collecting K first sound signals, wherein K is an integer greater than or equal to 2, wherein each of the K first sound signals includes a plurality of voice commands, each of the plurality of voice commands originates from a respective position of N different positions, wherein the respective position of each of the plurality of voice commands is different from the respective position of another voice command of the plurality of voice commands;
    extracting, by an in-vehicle central control device, M second sound signals from the K first sound signals according to N position parameters corresponding to the N different positions, wherein M is less than or equal to N and N is an integer greater than or equal to 2, and wherein each of the M second sound signals corresponds to a respective voice command of the plurality of voice commands;
    determining, by the in-vehicle central control device, the respective position corresponding to the respective second sound signal for each second sound signal of the M second sound signals;
    performing, by an in-vehicle central control device, speech recognition on the M extracted sound signals;
    obtaining, by the in-vehicle central control device, a plurality of speech commands from the M second sound signals;
    when the in-vehicle central control device recognizes a conflicting speech command within a preset time T1 after recognizing a high-priority speech command and when the recognized conflicting speech command has a low priority, ignoring, by the in-vehicle central control device, the conflicting speech command; and
    when the in-vehicle central control device recognizes conflicting speech commands after the preset time T1 after recognizing the high-priority speech command, responding to the conflicting speech commands, by the in-vehicle central control device, according to a chronological order in which the speech commands are recognized, wherein the conflicting speech commands are defined as speech commends that use the same resource, and wherein the speech commands request different operations during execution,
    wherein extracting, by the in-vehicle central control device, the M second sound signals from the K first sound signals according to the N position parameters corresponding to the N different positions specifically comprises:
        recognizing voice prints of the M extracted second sound signals;
        measuring a weight of a user on an occupied seat in a vehicle;
        determining an identity of the user with reference to the measured weight of the user and the recognized voice prints of the second sound signals;
        determining, according to the determined identity of the user, a priority of a speech command corresponding to a second sound signal emitted by the user; and
        responding, according to the priority of the speech command corresponding to the second sound signal emitted by the user, to the speech command corresponding to the second sound signal.

2. The method according to claim 1, wherein extracting M second sound signals from the K first sound signals according to the N position parameters corresponding to the N different positions specifically comprises extracting the M second sound signals from the K first sound signals separately according to the N position parameters by using a beamforming algorithm.

3. The method according to claim 1, wherein determining the respective position corresponding to each second sound signal specifically comprises determining, according to a position parameter corresponding to an $L^{th}$ second sound signal, a position L corresponding to the $L^{th}$ second sound signal, an wherein the $L^{th}$ second sound signal is any one of the M second sound signals.

4. The method according to claim 1, wherein responding to the speech commands comprises responding to a high-priority speech command according to priorities of the N different positions.

5. The method according to claim 1, further comprising determining, by the in-vehicle central control device, whether at least one seat in an in-vehicle system is occupied before collecting K first sound signals.

6. A system comprising:
    K sound collection sensors configured to collect K first sound signals, wherein K is an integer greater than or equal to 2, wherein each of the K first sound signals includes a plurality of voice commands, wherein each of the plurality of voice commands originates from a respective position of N different positions, wherein the respective position of each of the plurality of voice commands is different from the respective position of another voice command of the plurality of voice commands; and
    a processor and a non-transitory computer readable storage medium storing programming for execution by the processor, the programming including instructions to:
        extract M second sound signals from the K first sound signals according to N position parameters corresponding to the N different positions, wherein M is less than or equal to N and N is an integer greater than or equal to 2, and wherein each of the M second sound signals corresponds to a respective voice command of the plurality of voice commands;

determine the respective position corresponding to the respective second sound signal for each second sound signal of the M second sound signals;

perform speech recognition on the M extracted sound signals;

obtain a plurality of speech commands from the M second sound signals;

when the processor recognizes a conflicting speech command within a preset time T1 after recognizing a high-priority speech command and when the recognized conflicting speech command has a low priority, ignore the conflicting speech command; and when the processor recognizes conflicting speech commands after the preset time T1 after recognizing the high-priority speech command, respond to the conflicting speech commands according to a chronological order in which the speech commands are recognized, wherein the conflicting speech commands are defined as a speech commends that use the same resource, and wherein the speech commands request different operations during execution, wherein the instructions to extract the M second sound signals from the K first sound signals according to the N position parameters corresponding to the N different positions specifically comprises the instruction to:

recognize voice prints of the M extracted second sound signals;

measure a weight of a user on an occupied seat in a vehicle;

determine an identity of the user with reference to the measured weight of the user and the recognized voice prints of the second sound signals;

determine, according to the determined identity of the user, a priority of a speech command corresponding to a second sound signal emitted by the user; and respond, according to the priority of the speech command corresponding to the second sound signal emitted by the user, to the speech command corresponding to the second sound signal.

7. The system according to claim 6, wherein the instructions to extract M second sound signals from the K first sound signals according to the N position parameters corresponding to the N different positions specifically comprises instructions to extract the M second sound signals from the K first sound signals separately according to the N position parameters by using a beamforming algorithm.

8. The system according to claim 6, wherein the instructions to determine the position corresponding to each second sound signal specifically comprises instructions to determine, according to a position parameter corresponding to an $L^{th}$ second sound signal, a position L corresponding to the $L^{th}$ second sound signal, and wherein the $L^{th}$ second sound signal is any one of the M second sound signals.

9. The system according to claim 6, wherein the instructions to respond to the speech commands specifically comprises instructions to respond to a high-priority command according to priorities of the N different positions.

10. The system according to claim 6, wherein coordinates of the K sound collection sensors are different in a three-dimensional space.

11. The system according to claim 6, wherein the instructions further comprise to determine whether at least one seat in an in-vehicle system is occupied before collecting K first sound signals.

12. A non-transitory computer readable storage medium storing a program to be executed by a processor, wherein the processor is configured to execute the program to:

collect K first sound signals, wherein K is an integer greater than or equal to 2, wherein each of the K first sound signals includes a plurality of voice commands, each of the plurality of voice commands originates from a respective position of N different positions, wherein the respective position of each of the plurality of voice commands is different from the respective position of another voice command of the plurality of voice commands;

extract M second sound signals from the K first sound signals according to N position parameters corresponding to the N different positions, wherein M is less than or equal to N and N is an integer greater than or equal to 2, and wherein each of the M second sound signals corresponds to a respective voice command of the plurality of voice commands;

determine the respective position corresponding to the respective second sound signal for each second sound signal of the M second sound signals;

perform speech recognition on the M extracted sound signals;

obtain a plurality of speech commands from the M second sound signals;

when the processor recognizes a conflicting speech command within a preset time T1 after recognizing a high-priority speech command and when the recognized conflicting speech command has a low priority, ignore the conflicting speech command; and when the processor recognizes conflicting speech commands after the preset time T1 after recognizing the high-priority speech command, respond to the conflicting speech commands according to a chronological order in which the speech commands are recognized, wherein the conflicting speech commands are defined as speech commends that use the same resource, and wherein the speech commands request different operations during execution, wherein to extract the M second sound signals from the K first sound signals according to the N position parameters corresponding to the N different positions specifically comprises to:

recognize voice prints of the M extracted second sound signals;

measure a weight of a user on an occupied seat in a vehicle;

determine an identity of the user with reference to the measured weight of the user and the recognized voice prints of the second sound signals;

determine, according to the determined identity of the user, a priority of a speech command corresponding to a second sound signal emitted by the user; and respond, according to the priority of the speech command corresponding to the second sound signal emitted by the user, to the speech command corresponding to the second sound signal.

13. The non-transitory computer readable storage medium according to claim 12, wherein to extract the M second sound signals from the K first sound signals according to the N position parameters corresponding to the N different positions comprises to separately extract the M second sound signals from the K first sound signals according to the N position parameters using a beamforming algorithm.

14. The non-transitory computer readable storage medium according to claim 12, wherein to determine, for each second sound signal of the M second sound signals, the respective position corresponding to the respective second sound signal comprises to determine, according to a position parameter corresponding to an $L^{th}$ second sound signal, a position L corresponding to the $L^{th}$ second sound signal, wherein the $L^{th}$ second sound signal is any one of the M second sound signals.

15. The non-transitory computer readable storage medium according to claim 12, wherein to respond to each of the plurality of speech commands comprises to responding to a high-priority speech command of the plurality of speech commands according to priorities of the N different positions.

16. The non-transitory computer readable storage medium according to claim 12, further comprising to determine whether at least one seat in an in-vehicle system is occupied before collecting K first sound signals.

* * * * *